(12) United States Patent
Sono

(10) Patent No.: US 7,017,867 B2
(45) Date of Patent: Mar. 28, 2006

(54) WHEEL-LIKE WIRE HOLDER

(75) Inventor: Yoshiyuki Sono, Fukui (JP)

(73) Assignee: Orion Electric Co., Ltd., Fukui (JP)

( * ) Notice: Subject to any disclaimer, the term of this patent is extended or adjusted under 35 U.S.C. 154(b) by 94 days.

(21) Appl. No.: 10/716,603

(22) Filed: Nov. 20, 2003

(65) Prior Publication Data

US 2004/0108419 A1   Jun. 10, 2004

(30) Foreign Application Priority Data

Nov. 26, 2002   (JP) ............................. 2002-342464

(51) Int. Cl.
*H01B 17/00* (2006.01)
(52) U.S. Cl. .................. 248/74.1; 248/74.2; 248/74.3; 174/154; 174/167; 174/198
(58) Field of Classification Search ............... 248/74.1, 248/65, 74.2, 74.3, 74.4; 174/138, 196, 154–157, 174/167–170; 24/129 R, 136 R
See application file for complete search history.

(56) References Cited

U.S. PATENT DOCUMENTS

| | | | | |
|---|---|---|---|---|
| 3,280,529 A | * | 10/1966 | Kuno ........................... 52/689 |
| D223,701 S | * | 5/1972 | Lusch ......................... D8/356 |
| 4,555,589 A | * | 11/1985 | Osada ........................ 174/156 |
| 4,715,571 A | * | 12/1987 | Soltow et al. ............. 248/68.1 |
| D344,012 S | * | 2/1994 | Aoki ........................... D8/356 |
| 5,347,787 A | * | 9/1994 | Gavin ......................... 52/677 |
| D358,545 S | * | 5/1995 | Price ........................... D8/356 |
| D362,382 S | * | 9/1995 | Cloud ......................... D8/354 |
| D382,463 S | * | 8/1997 | Cloud ......................... D8/354 |
| 6,325,340 B1 | * | 12/2001 | Yonezawa .................. 248/74.1 |
| 6,465,741 B1 | * | 10/2002 | Pionek et al. ............... 174/174 |
| D478,269 S | * | 8/2003 | Snyder ....................... D8/354 |
| 2004/0108419 A1 | * | 6/2004 | Sono ........................... 248/63 |

FOREIGN PATENT DOCUMENTS

JP   5-85082   11/1993

* cited by examiner

*Primary Examiner*—Ramon O. Ramirez
*Assistant Examiner*—Steven Marsh
(74) *Attorney, Agent, or Firm*—Wenderoth, Lind & Ponack, L.L.P.

(57) ABSTRACT

To firmly hold a high-voltage wire apart from its surroundings, and hold some nearby lead wires apart from the high-voltage wire, a wheel-like wire holder includes a ring, a central hub, and a plurality of spokes connecting the central hub to the ring. The central hub defines a central space to allow a high-voltage lead wire to fit therein, wherein the ring and hub have cuts on their circumferences, which cuts are connected by two spokes to define a radial passage for the central space to communicate with an exterior of the ring. The cut of the ring is adapted to be open and closed, and the ring has an extra space defined next to the cut for accommodating another lead wire thereinside, with the extra space being adapted to be open and closed.

16 Claims, 3 Drawing Sheets

WHEEL-LIKE WIRE HOLDER

BACKGROUND OF THE INVENTION

1. Field of the Invention

The present invention relates to a wheel-like wire holder for holding a live high-voltage wire at an isolating central space, which is inaccessible to any surrounding wire or parts.

2. Related Art

In a certain electric appliance such as a television receiver, a plurality of electric wires are used to apply electromotive force of high-frequency and/or high-voltage to some selected parts, and then such live wires need to be isolated from surrounding electric wires and parts so that no adverse effects or interference may be caused thereon. To assure that such live high-voltage or high-frequency wires are kept apart from the surrounding wires and parts, a variety of wire holders are used. One example of such a wire holder is shown in JP 5-85082(U), titled "Electric Wire Holder".

This wire holder looks like a wheel, comprising a ring, a central hub, two bifurcate spokes and one split-spoke connecting the central hub to the ring. The central hub defines a central space to allow a high-voltage lead wire to fit therein, and the ring cuts off access to the high-voltage lead wire, which is press-fitted in the central hub. The central hub consists of three solid cylinders arranged circularly and separated an equi-angular distance from each other. The two bifurcate spokes and the split-spoke connect each two adjacent cylinders to an inner circumference of the ring. The ring has a cut to define a loophole. The split-spoke connects selected two adjacent cylinders to confronting edges of the loophole, thus defining a radial passage to the hub space. Specifically, the radial passage is defined by confronting, outwardly-diverging radial pieces of the split-spoke, thereby allowing an electric lead wire to follow the radial passage and fit in the hub space.

Referring to FIG. 4, such a wire holder 3 holds an anode lead wire 2 extending to a flyback transformer 1, thereby preventing any surrounding wire from coming close to this live high-voltage lead wire 2. The anode lead wire 2 is inserted from loophole 4 into central hub space 5. Disadvantageously, however, this wire holder structure permits another lead wire to invade through the loophole 4 and come close to the high-voltage wire 2. Still disadvantageously, the wire holder can easily slide along the high-voltage lead wire 2, and thus, it cannot guarantee that an isolating central space is inaccessible to any surrounding wire.

With a view to keep a nearby wire apart from the live high-voltage lead wire, the nearby wire is bounded to the ring with a binding wire. This binding work, however, is troublesome, and the unbinding is troublesome, too. Use of binding wires increases cost.

In view of the above one object of the present invention is to provide a wheel-like wire holder which is capable of keeping a high-voltage wire apart from its surroundings, and of holding another lead wire apart from the high-voltage wire.

SUMMARY OF THE INVENTION

To attain this object a wheel-like wire holder comprises a ring, a central hub, and a plurality of spokes connecting the central hub to the ring. The central hub defines a central space to allow a high-voltage lead wire to fit therein. This wire holder is improved in that the ring and hub have cuts on their circumferences, which cuts are connected by two spokes to define a radial passage for the central space to communicate with an exterior of the ring. The cut of the ring is adapted to be open and closed, and the ring has an extra space defined next to the cut for accommodating another lead wire thereinside. The extra space is also adapted to be open and closed.

The central space of the central hub and the radial passage may form a loophole defined by opposite ends of the two spokes radially extended toward the ring, with one of these spokes reaching short of the ring and being bent to provide a sub-spoke, which is connected the ring to define the extra space, whereas the other spoke is connected to the ring and has a barrier piece projecting toward the extra space, thereby blocking access to the central hub.

The ring may have fastening pieces formed on confronting ends of its cut to close and open the loophole.

Other objects and advantages of the present invention will be understood from the following description of a wheel-like wire holder according to one preferred embodiment of the present invention, which is shown in accompanying drawings.

DETAILED DESCRIPTION OF PREFERRED EMBODIMENT

Figure 1:
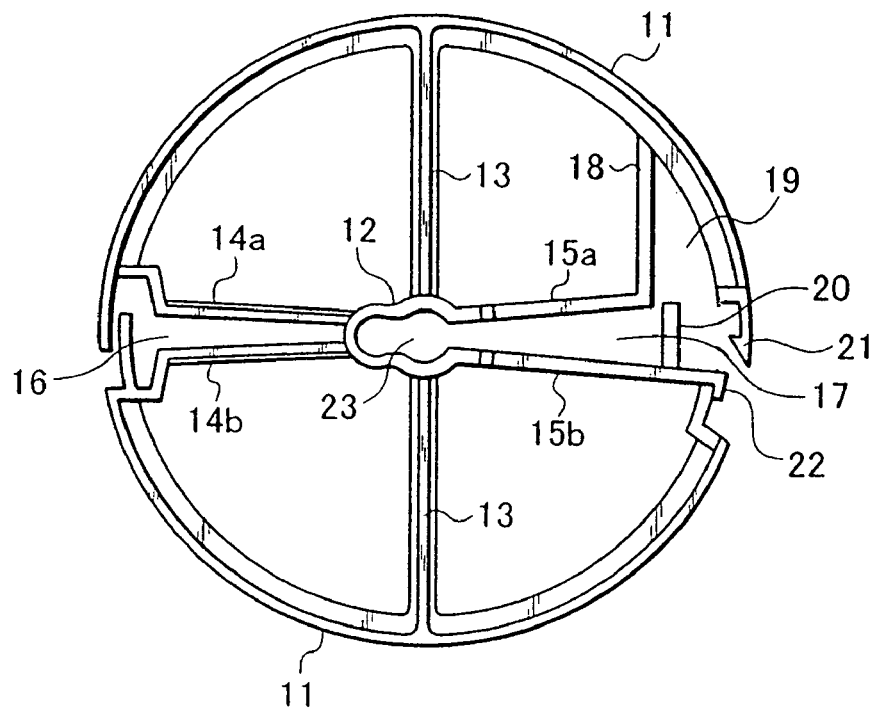
FIG. 1 illustrates a wheel-like wire holder according to the present invention with its loophole open.

Referring to FIG. 1, a wheel-like wire holder according to one embodiment of the present invention comprises a ring 11, a central hub 12, and a plurality of spokes 13,13; 14a, 14b and 15a and 15b. These spokes connect the central hub 12 to the ring 11. The spokes 14a and 14b somewhat diverge outwardly to define a sector space 16 therebetween. Likewise, the spokes 15a and 15b somewhat diverge outwardly to define a sector space 17 therebetween. As seen from the drawing, these sector spaces 16 and 17 extend radially from central hub space 23 to the ring 11. The central hub space 23 and the sector space 17 form a loophole defined by opposite ends of the two spokes 15a, 15b radially extended toward the ring. The ring 11 is cut at two points between the spokes 14a and 14b, as well as between the spokes 15a and 15b, respectively, so that the sector spaces 16 and 17 are communicated with an exterior of the ring.

The central hub space 23 communicates with the sector space 17, and the sector space 17 increases or decreases with deformation of the hub space 23. Likewise, the sector space 16 varies in size. The spoke 15a reaches short of the ring 1, and is bent to provide a sub-spoke 18, which is connected to the ring 11 to define a generally triangular or extra space 19 between the sub-spoke 18 and the ring 11.

The spoke 15b is connected to the ring 11. Thus, the spokes 15a and 15b define a radial passage accessible from the exterior of the ring 11 to the central space 23. Also, the spoke 15b has a barrier piece 20 projecting toward the generally triangular space 19, thereby cutting off access to the central hub space 23. The ring 11 has fastening pieces 21 and 22 formed on confronting ends of the cut to close and open the loophole (23 and 17). The fastening pieces are a hook 21 and a projection 22 to engage with each other (see FIGS. 1 and 2).

Figure 2:
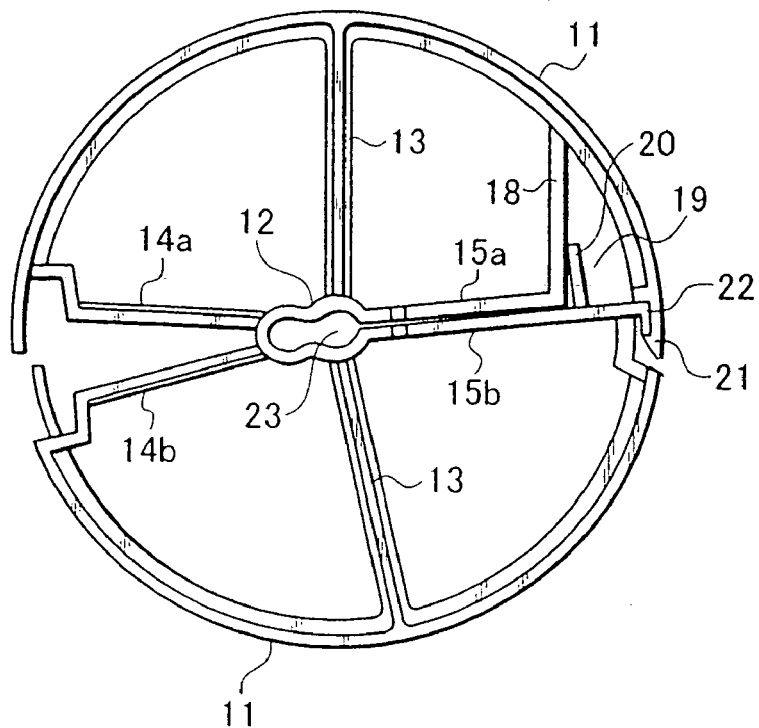
FIG. 2 illustrates the wheel-like wire holder with its loophole closed.
Figure 3:
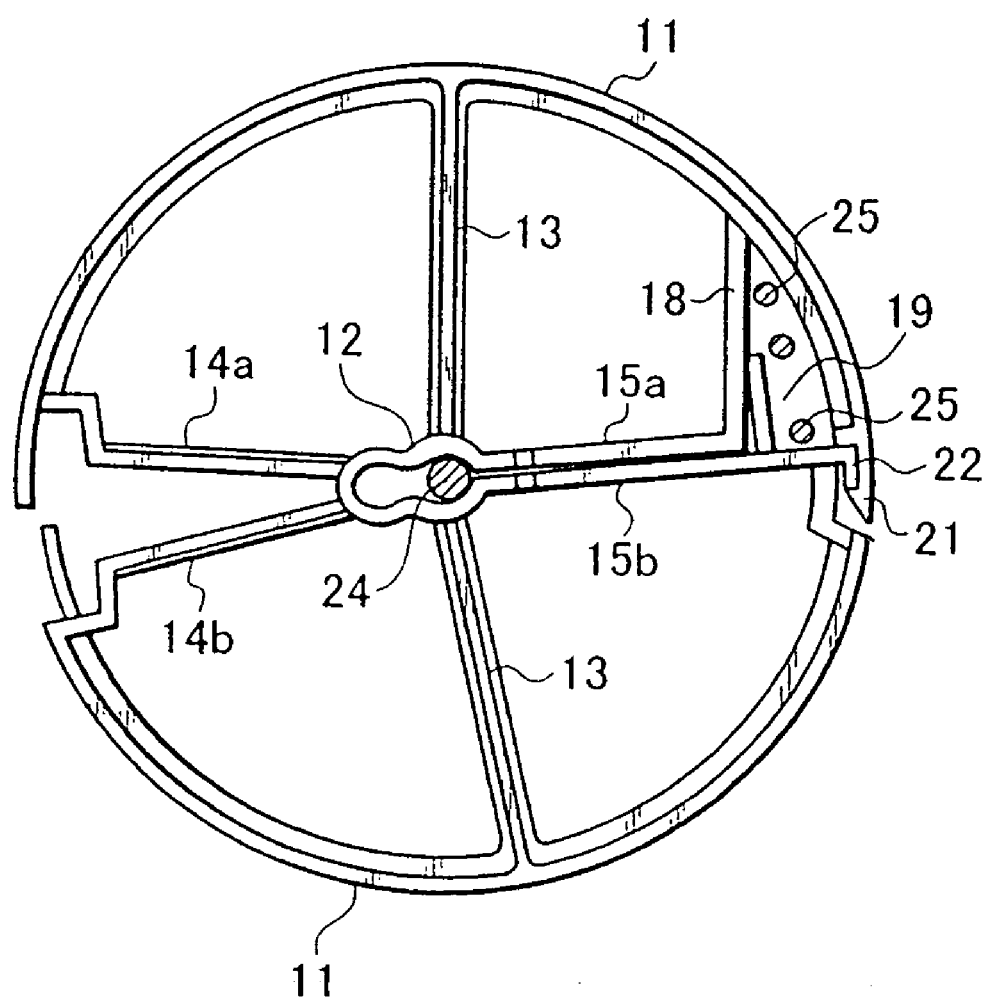
FIG. 3 illustrates the wheel-like wire holder with a high-voltage lead wire fit thereto, and some lead wires contained in an extra space.
Figure 4:
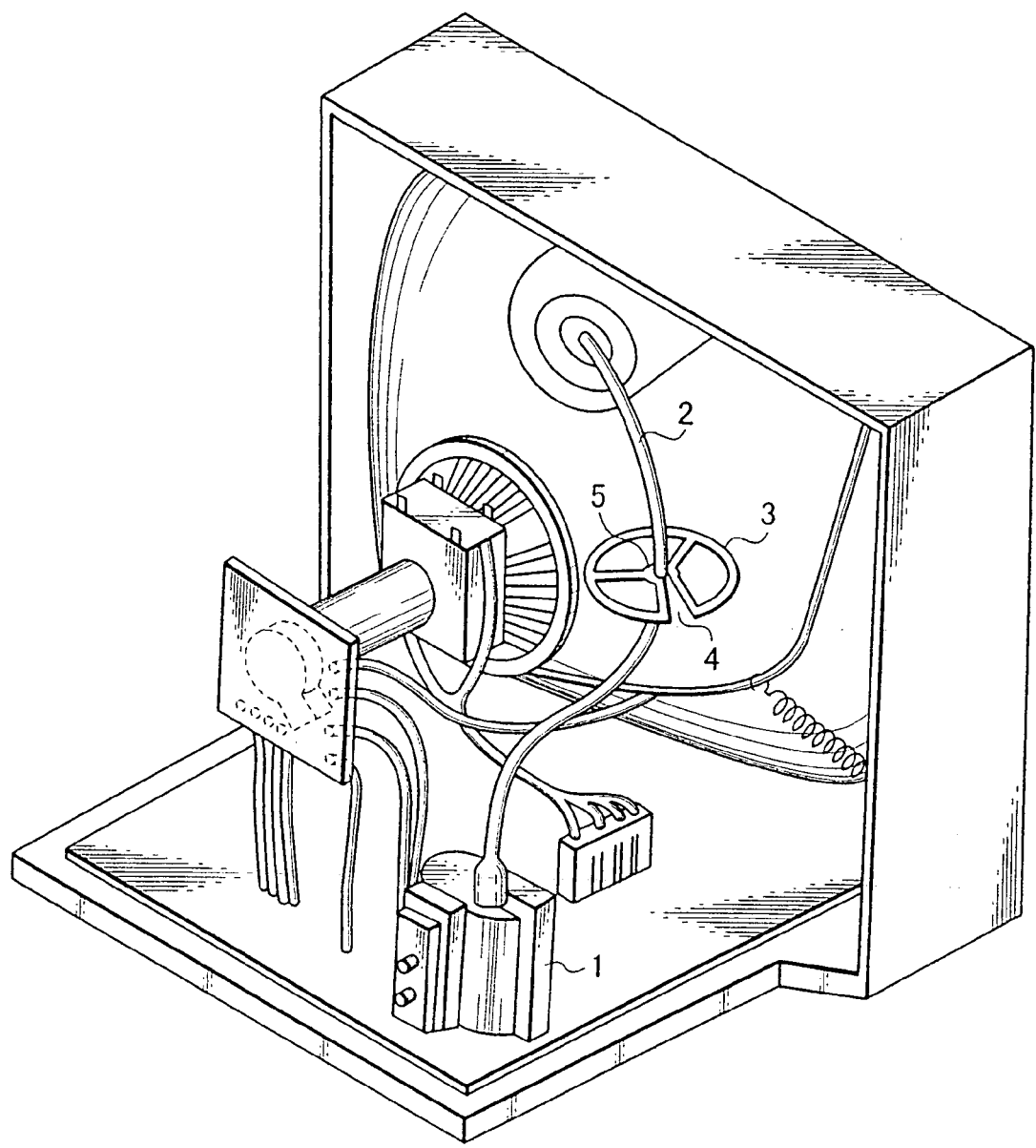
FIG. 4 illustrates a conventional wheel-like wire holder holding an anode lead wire in a television receiver.

FIG. 2 shows the wheel-like holder with the sector space 17 closed and with the sector space 16 open. In a closing position the fastening pieces 21 and 22 are caught by each other. Referring to FIG. 3, the generally triangular space 19 is closed with other wires 25 contained therein. Such extra wires 25 cannot come close to a high-voltage wire 24 at the central hub space 23.

This high-voltage lead wire 24 is inserted from the loophole of the ring 11 to follow the sector passage 17 to the central hub space 23. Referring to FIG. 3 again, the high-voltage lead wire 24 is press-fitted in the hub space 23, and the loophole is closed to change a shape of the hub 12, thereby reducing the central hub space 23 to tightly hold the high-voltage lead wire 24. Thus, the wheel-like wire holder is firmly fastened to the high-voltage lead wire 24, and it cannot slide along a surface of the high-voltage lead wire. Nearby lead wires 25 are confined in the generally triangular or extra space 19.

The wheel-like wire holder provides advantages as follows:

no lead wires are allowed to come close to a high-voltage lead wire once confined in the hub space;

access to the central hub space is blocked by the barrier piece, thereby preventing inadvertent insertion of another lead wire into the central hub space while it is being put into the generally triangular or extra space 19; and closure of the loophole with the fastening pieces caught together causes the high-voltage lead wire to be tightly squeezed in the central hub space, thereby assuring that the wire holder is prevented from sliding along and departing from the high-voltage lead wire.

What is claimed is:

1. A wire holder comprising:
   a ring having a first opening along a periphery thereof, said first opening being adapted to be closed and defining first and second ends of said ring that confront one another via said first opening;
   a central hub having a second opening along a periphery thereof, said second opening defining first and second ends of said central hub that confront one another via said second opening, and said central hub defining a central space for allowing a high-voltage lead wire to be fit thereinto;
   spokes extending from said second opening and defining a radial passage for allowing said central space to communicate with an exterior of said ring, said spokes including
   (i) a first spoke extending generally radially and interconnecting said first end of said central hub and said first end of said ring, and
   (ii) a second spoke extending generally radially from said second end of said central hub and terminating short of said second end of said ring; and
   an extra space for accommodating therein another lead wire, said extra space being in communication with said first opening, and said extra space being adapted to be closed,
   wherein said radial passage is defined between said first spoke and said second spoke, and said extra space is partially defined by said second spoke terminating short of said second end of said ring.

2. The wire holder according to claim 1, further comprising:
   a sub-spoke integrally connected to said second spoke, and extending laterally from said second spoke to a connection point on said ring at which said sub-spoke is connected to said ring,
   such that said extra space is defined by said sub-spoke and an arcuate portion of said ring extending from said connection point to said second end of said ring, with said extra space also being in communication with said radial passage via an opening of said extra space defined between where said sub-spoke is integrally connected to said second spoke and said second end of said ring.

3. The wire holder according to claim 2, wherein
   said radial passage and said extra space are each adapted to be closed by having said first and second ends of said ring approach one another such that said first and second spokes approach one another, and then by having said first and second ends of said ring be joined to one another.

4. The wire holder according to claim 3, further comprising:
   a barrier piece for blocking access of the another lead wire to said central space and for guiding the another lead wire to said extra space, said barrier piece extending laterally from said first spoke toward said extra space.

5. The wire holder according to claim 4, further comprising:
   fastening pieces on said first and second ends of said ring, respectively, said fastening pieces being adapted to be engaged with one another,
   such that said radial passage and said extra space are closed when said fastening pieces are engaged with one another, and said radial passage and said extra space are open when said fastening pieces are not engaged with one another.

6. The wire holder according to claim 3, further comprising:
   fastening pieces on said first and second ends of said ring, respectively, said fastening pieces being adapted to be engaged with one another,
   such that said radial passage and said extra space are closed when said fastening pieces are engaged with one another, and said radial passage and said extra space are open when said fastening pieces are not engaged with one another.

7. The wire holder according to claim 2, further comprising:
   a barrier piece for blocking access of the another lead wire to said central space and for guiding the another lead wire to said extra space, said barrier piece extending laterally from said first spoke toward said extra space.

8. The wire holder according to claim 1, wherein
   said radial passage and said extra space are each adapted to be closed by having said first and second ends of said ring approach one another such that said first and second spokes approach one another, and then by having said first and second ends of said ring be joined to one another.

9. The wire holder according to claim 8, further comprising:
   a barrier piece for blocking access of the another lead wire to said central space and for guiding the another lead wire to said extra space, said barrier piece extending laterally from said first spoke toward said extra space.

10. The wire holder according to claim 9, further comprising:
    fastening pieces on said first and second ends of said ring, respectively, said fastening pieces being adapted to be engaged with one another,
    such that said radial passage and said extra space are closed when said fastening pieces are engaged with one another, and said radial passage and said extra space are open when said fastening pieces are not engaged with one another.

11. The wire holder according to claim 8, further comprising:
  fastening pieces on said first and second ends of said ring, respectively, said fastening pieces being adapted to be engaged with one another,
  such that said radial passage and said extra space are closed when said fastening pieces are engaged with one another, and said radial passage and said extra space are open when said fastening pieces are not engaged with one another.

12. The wire holder according to claim 1, further comprising:
  a barrier piece for blocking access of the another lead wire to said central space and for guiding the another lead wire to said extra space, said barrier piece extending laterally from said first spoke toward said extra space.

13. A wire holder comprising:
  a ring having a first opening along a periphery thereof, said first opening being adapted to be closed;
  a central hub having a second opening along a periphery thereof, said central hub defining a central space for allowing a high-voltage lead wire to be fit thereinto;
  spokes extending from said second opening and defining a radial passage for allowing said central space to communicate with an exterior of said ring;
  an extra space for accommodating therein another lead wire, said extra space being in communication with said first opening, and said extra space being adapted to be closed; and
  a sub-spoke integrally connected to one of said spokes, and extending laterally from said one of said spokes toward a point on said ring,
  such that said extra space is defined by said sub-spoke and an arcuate portion of said ring extending from said point to an end of said first opening.

14. The wire holder according to claim 13, wherein
  said radial passage and said extra space are each adapted to be closed by having said spokes approach one another.

15. The wire holder according to claim 14, further comprising:
  a barrier piece for blocking access of the another lead wire to said central space and for guiding the another lead wire to said extra space, said barrier piece extending laterally from another of said spokes toward said extra space.

16. The wire holder according to claim 13, further comprising:
  a barrier piece for blocking access of the another lead wire to said central space and for guiding the another lead wire to said extra space, said barrier piece extending laterally from another of said spokes toward said extra space.

* * * * *